(12) United States Patent
Zhao et al.

(10) Patent No.: US 8,154,991 B2
(45) Date of Patent: Apr. 10, 2012

(54) ARRANGEMENT AND A METHOD FOR HANDLING FAILURES IN A NETWORK

(75) Inventors: Wei Zhao, Solna (SE); Johan Kölhi, Vaxholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 215 days.

(21) Appl. No.: 12/682,470

(22) PCT Filed: Oct. 9, 2007

(86) PCT No.: PCT/SE2007/050722
§ 371 (c)(1),
(2), (4) Date: Apr. 9, 2010

(87) PCT Pub. No.: WO2009/048358
PCT Pub. Date: Apr. 16, 2009

(65) Prior Publication Data
US 2010/0208595 A1    Aug. 19, 2010

(51) Int. Cl.
*H04J 1/16* (2006.01)
(52) U.S. Cl. .................... 370/216; 370/351; 370/400
(58) Field of Classification Search .............. 370/255, 370/351, 389, 216, 400, 231, 238, 242, 248
See application file for complete search history.

(56) References Cited

U.S. PATENT DOCUMENTS

| | | | |
|---|---|---|---|
| 6,292,463 B1 * | 9/2001 | Burns et al. | 370/216 |
| 6,496,476 B1 * | 12/2002 | Badt et al. | 370/228 |
| 7,426,179 B1 * | 9/2008 | Harshavardhana et al. | 370/219 |

* cited by examiner

*Primary Examiner* — Brenda H Pham
(74) *Attorney, Agent, or Firm* — Roger S. Burleigh (57) ABSTRACT

The present invention relates to an arrangement comprising an Ethernet carrier network, managed by a management system (100) and comprising a number of levels of management domains, each comprising a number of edge nodes (10, 20, 30, 40) and a number of intermediate nodes (1, 2, 3, 4, 5, 6, 7, 8). Each edge node (10, 20, 30, 40) comprises fault detection of connectivity check messages and fault locating means with holding means (11, 21, 31, 41) adapted to hold path information for the paths to all other edge nodes. A fault detection means of an edge node having detected a fault is adapted to activate edge node fault locating means to locate the fault using the patch information in the edge node holding means to find a first target intermediate node substantially in the middle of the path containing the fault, and to, directly, send a first loop back message to said intermediate node. A response from said intermediate node indicates that the fault is located at the distant portion of the path, no response indicates that the fault is located at the proximate portion of the path. Further loop back messages are sent to consecutively identified intermediate nodes of the respective path portion identified to contain the fault by the respective preceding loop back message until the fault is localized.

7 Claims, 7 Drawing Sheets

Fig. 7

ARRANGEMENT AND A METHOD FOR HANDLING FAILURES IN A NETWORK

TECHNICAL FIELD

The present invention relates to fault handling in Ethernet network which is managed by a management system and which comprises a number of levels of management domains.

STATE OF THE ART

Ethernet is one of the most important Local Area Network (LAN) technologies. Actually it is the leading LAN technology. This is mainly due to a plurality of intrinsic characteristics of the technology which makes it simple, cheap and easy to manage and in addition thereto backwards compatible. Operators and carriers are considering the possibility of reaping the benefits of Ethernet by replacing SONET/SDH &Synchronous Digital Hierarchy) infrastructures with Ethernet infrastructures since data services account for the bulk of traffic. However, backbone networks and metro networks have requirements which differ quite a lot from those of enterprise LANs. Consequently a deployment of Ethernet technology would require specific enhancements and several modifications in order to be able to fulfil such carrier-grade requirements. Important modifications that sire needed to make an Ethernet network carrier-grade among other things include a fast failure localization and also recovery mechanism which is essential in order to support real time services.

In several network management systems SNMP (Simple Network Management Protocol) is used tor detecting or locating link or node failures in the network. When a link or node failure occurs, the affected network device will send an SNMP trap to the SNMP server in the Network Management System (NMS) as an. alarm. The NMS can then take responsive actions for recovery, for example set up an alternative path, etc.

IEEE has specified a standard, 802.1ag "Connectivity Fault Management", addressing Ethernet Connectivity Fault Management (CFM). It provides a complete architecture with functional blocks and a protocol set. In the standard the end-to-end network connection is splitted into different levels of management domains, or so called Maintenance Associations (MA). Within each MA level, a number of Maintenance End Points (MEP) and Maintenance Intermediate Points (MIP) are allocated. Within each MA level the procedure of failure detection and localization briefly takes place as follows: MEPs send. Connectivity Check Messages (CCMs) periodically as heart-beating messages based on a pre-defined time interval; an MEP raises an alarm to NMS if no CCM is received within a time period of three times the pre-defined time interval; the MEP sends Link Trace messages to obtain address information of MIPs; an MEP sends Loop Back messages to corresponding MIPs to locate a failure. Subsequently a Spanning-Tree Protocol (STP) or a Rapid Spanning Tree Protocol (RSTP) is used to re-calculate the path.

CFM also offers alternative mechanisms for fault detection and localization including CFM with the extensions as suggested in ITU-T Y.1731 "OAM FUNCTIONS AND MECHANISMS FOR ETHERNET BASED NETWORKS" may generate an AIS (Alarm Indication Signal) notifying the egress or NMS of the fault and its location, or deployment of link level MEPs which detect errors and notify NMS or, as with SNMP, generate AIS for higher layer MAs.

It is also possible to use GMPLS (Generalised MPLS) and LMP for purposes of fault localization.

It is however a disadvantage that SNMP based solutions are extremely slow which makes them unsuitable for carrier Ethernet architectures.

802.1ag is based on layer 2 technology and it can be made fairly fast. However, it suffers from disadvantages and limitations which make the performance non-optimal. First, 802.1ag assumes that MIPs are invisible to NMS and. MEPs. Due to the fact that 802.1ag aims at a solution for end-to-end service provisioning in a very general scope it is actually a very flexible solution and therefore it is not optimized as far as rate and performance is concerned. Second, 802.1ag defines the available information a CCM can provide in terms of a connectivity fault, but it does not specify who is the recipient of the information and how the information shall be used and reacted upon. Further 802.1ag uses STP or RSTP to find out an alternative path when a failure occurs, but STP as well as RSTP can have a quite slow convergence time. In addition thereto operators may choose to disable STP or RSTP in their networks. Still further CFM with AIS is not applicable to multi-point Ethernet service which is a serious drawback since multi-point Ethernet services are exceedingly important for the provisioning of multi-media applications, such as tor example IPTV. In addition thereto link level MEP can impose a limitation as far as scalability is concerned. Another disadvantage is that interactions between GMPLS, LMP and CFM are not clear.

Thus, these disadvantages contribute in reducing the possibility and attractivity of using Ethernet as a carrier network, mainly in that fault detection and path localization is not as fast and efficient as needed and desirable for several applications.

SUMMARY

It is an object of the present invention to solve one or more or the above mentioned problems and to provide an arrangement as initially referred to which enables fast detection and localization of faults. It is also an object of the invention to provide an arrangement enabling easy and reliable failure (fault) detection and localization. Still, further it is an object to provide a solution which imposes no scalability limitations and which allows applicability to multipoint Ethernet services. It is most particularly an object of the invention to enable for fast and simple recovery after detection and localization of a fault. Still further it is an object of the invention to provide an arrangement which does not suffer from a slow convergence time and through which the Ethernet network can be made carrier-grade and through which real time services can be delivered in a satisfactory manner.

It is also an object of the invention to provide an edge node as initially referred to through which one or more of the above mentioned objects can be achieved. It is still further an object of the invention to provide a method through which one or more of the above mentioned objects can be achieved.

According to the present invention a solution is suggested through which IEEE 802.1ag can be said to be extended such that fast, easy and efficient fault detection and localization can be provided, particularly or optionally also fault recovery.

An arrangement as initially referred to is therefore provided which comprises a number of levels of management domains, each comprising a number of edge nodes (e.g. maintenance end points) and a number of intermediate nodes (e.g. maintenance intermediate points). Each management domain particularly corresponds to a level, or vice versa. According to the invention, each edge node in a maintenance domain comprises holding means adapted to hold path information for the paths to ail other edge nodes in the management domain. This path information comprises information about all intermediate nodes of the respective paths in the maintenance domain. The edge nodes are adapted to detect faults or failures by sending and receiving connectivity check messages. An edge node having detected a fault is adapted to identify a target intermediate node substantially in the middle of the path between the edge node and another edge node not responding to a connectivity check message (CCM) (or from which it does not receive a CCM for a given time period), and to directly send a first loop back message to the said identified target intermediate node. It is further adapted to establish if a response is received from the target intermediate node. Reception of a response indicates that the fault is located at the distant part the path connecting to or closer to the other edge node. No response indicates that the fault is located at the proximate part of the path connecting to or being closer to the edge node having detected the fault. The detecting edge node is adapted to repeat the procedure by identifying a target intermediate node substantially in the middle of the portion, distant or proximate, of the path identified to contain the fault by the respective preceding loop back message and identifying the respective "subsequent" fault portion, distant or proximate, containing the fault until the fault has been localized.

According to the invention an edge node, or a maintenance end point, of an Ethernet based carrier or access network adapted to be managed by a management system is also provided which comprises fault detection means comprising sending/receiving connectivity check messages and fault localization means. Said fault localization means comprise or communicate with holding means for holding path information for all the paths between the edge node and all other edge nodes in one and the same management domain, including all intermediate nodes of the respective paths. The fault localization means are adapted to, at detection of a fault on a path, (by the fault detection means) to another edge node identify a target intermediate node substantially in the middle of the path, to send, directly, a loop back message to said target node, and to, based on whether a response is received from the target node or not, identify if the distant or proximate portion of the path, connecting to the distant or second edge node or to the first or detecting edge node, is the path portion containing the fault. The fault localization means are also adapted to, unless the fault is already localized, identify a new target intermediate node substantially in the middle of the path portion previously identified as containing the fault and to send a loop back message to said new target intermediate node, and to repeat the procedure of finding a subsequent target intermediate node, identifying the fault containing path portion etc. until the fault has been found or localized, thus for each step reducing by the path portion that needs to be examined, i.e. the number of intermediate nodes to which loop back messages need to be sent.

The invention also provides a method as initially referred to which comprises the steps of; implementing fault detection by sending/receiving connectivity check messages from each edge node in a management domain to all other edge nodes in the same management domain; at detection, in a first edge node, of a fault on the path between said first edge node and another, second, edge node, fetching information about the path containing the intermediate nodes on said path from holding means in the first edge node; identifying a target intermediate node substantially in the middle of said path; sending, directly, a loop back message to the identified target intermediate node; identifying a fault path portion as the portion of the path containing the fault based on whether a response is received or not from the identified target intermediate node such as: if a response is received, the fault path portion is identified as the distant path portion adjacent to or connecting to the second edge node, whereas if no response is received, the fault path portion is identified as the path portion adjacent to or connecting to the first edge node, then, unless the fault localized, identifying a respective subsequent target intermediate middle node and a subsequent fault path portion, step by step, until the fault is localized. In a particular embodiment a fault is localized when the distance between a target intermediate node and the first or second edge node corresponds to one line, i.e. when there are no nodes inbetween the edge nodes closest to the target node and the target node.

It is an advantage of the invention that a fast and simple fault detection and localization is enabled. It is also an advantage that the message overhead, i.e. the number of messages that need to be sent in order to localize a fault, is considerably reduced as compared to known methods. It is also an advantage that a fast and efficient fault recovery is enabled. It is particularly an advantage that an arrangement and a method respectively is provided which make deployment of Ethernet based carrier or access networks very advantageous and attractive e.g. for operators and users.

BRIEF DESCRIPTION OF THE DRAWINGS

The invention will in the following be more thoroughly described, in a non-limiting manner, and with reference to the accompanying drawings, in which.

DETAILED DESCRIPTION OF THE INVENTION

Figure 1:
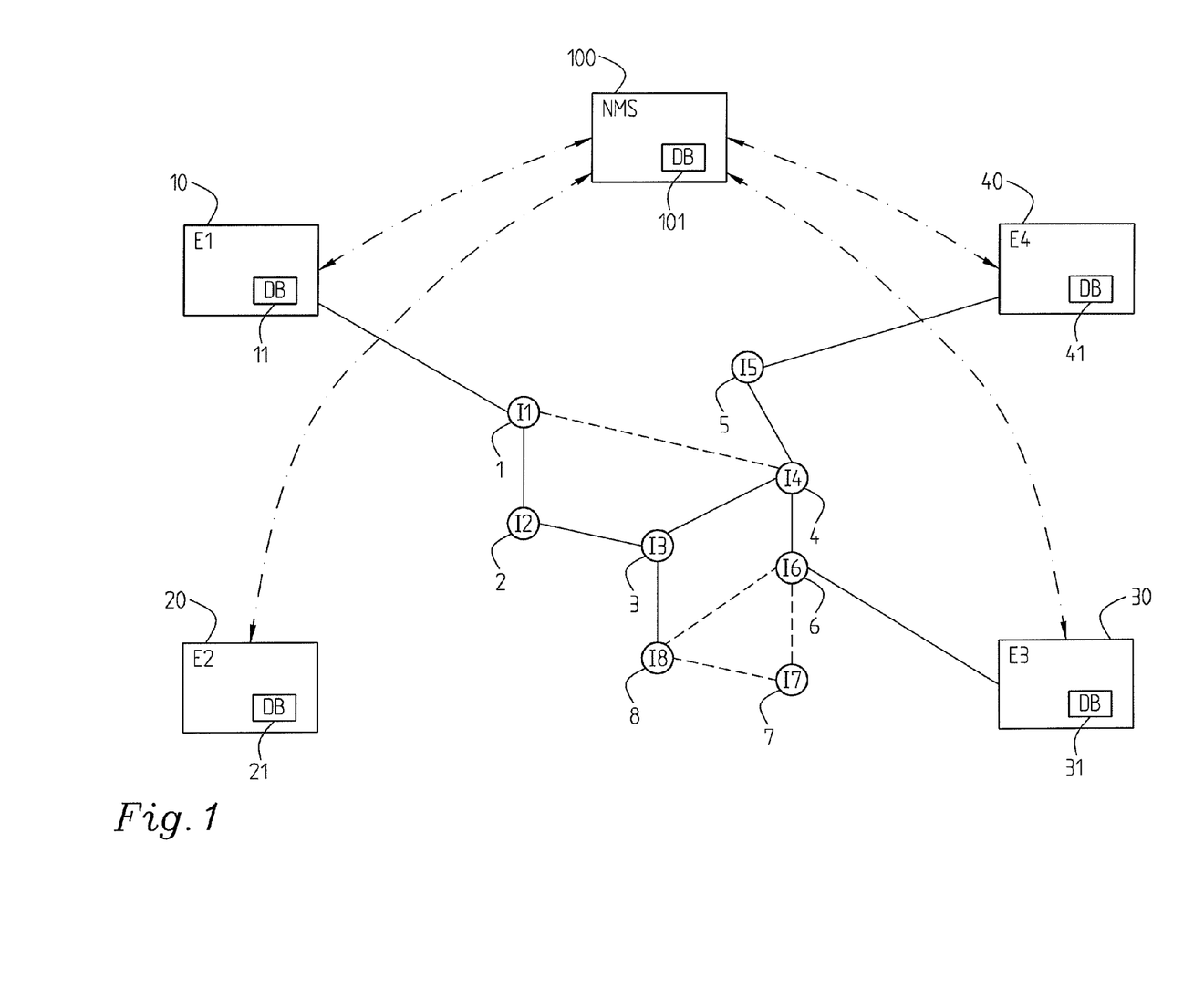
FIG. 1 is a schematical block diagram of an arrangement according to a first embodiment of the present invention.
Figure 2:
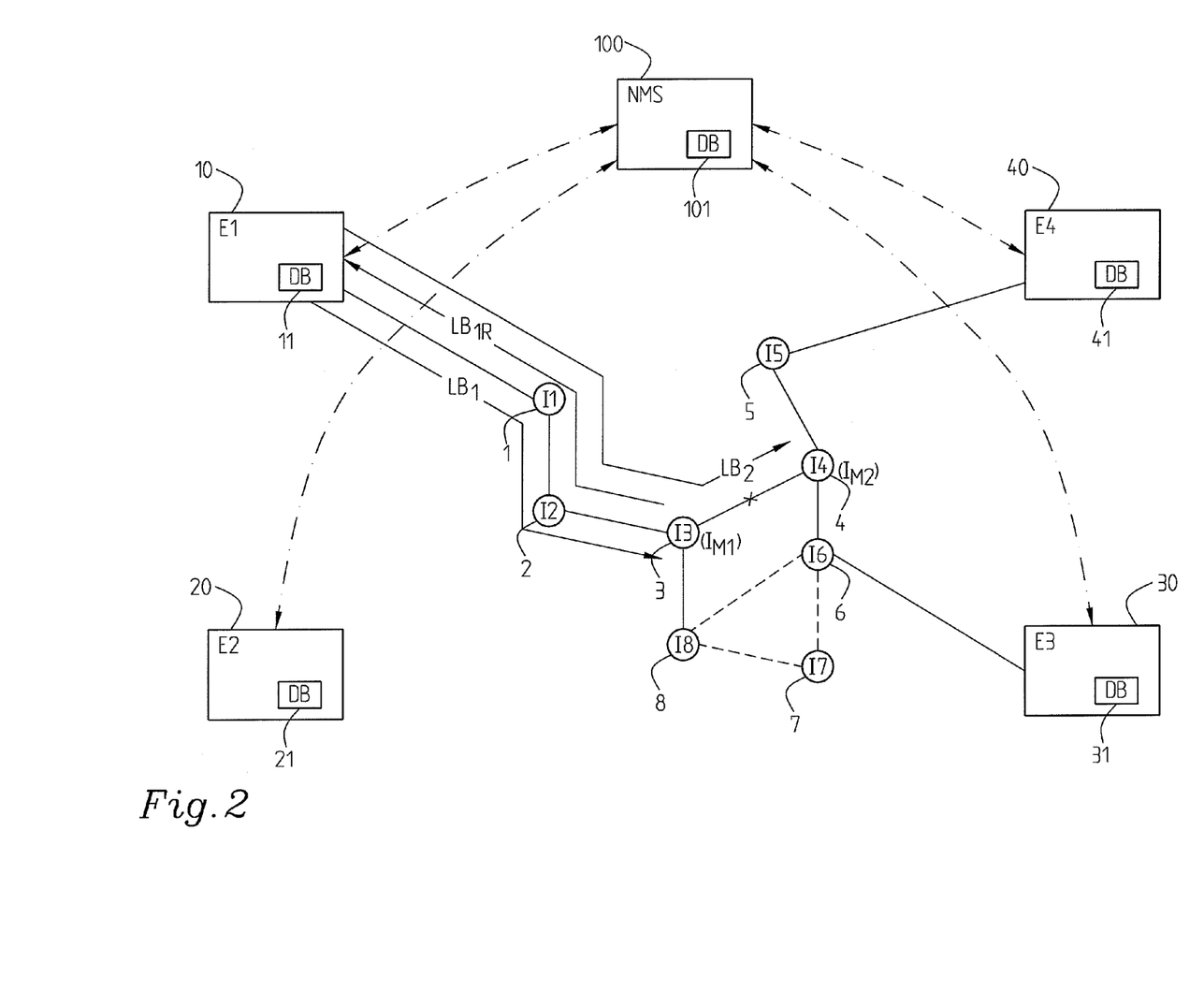
FIG. 2 is a block diagram of the arrangement of FIG. 1 when a fault has occurred and a link is broken.

In a particular embodiment, cf. FIG. 1, FIG. 2 of the invention an edge node 10 is adapted to report fault information of a localized fault to the network management system 100. However, preferably it is not dependent on any reaction on behalf of the management system, but capable to handle temporary recovery itself or independently of the network management system.

Optionally an edge node 10; 20; 30; 40; 50; 60 is adapted to handle detection and localization of faults on nodes and links. Particularly it is capable of distinguishing between node faults and link faults (failures). Alternatively it is merely capable of identifying a fault, the fault being either on a node or on a link connecting to the node.

In an advantageous implementation connectivity check messages (CCM) are implemented for the detection of faults. In one embodiment this e.g. means that an edge node 10; 20; 30; 40; 50; 60 is adapted to periodically send such CCM messages to all other edge nodes or end points and detecting that there is a fault if there is no response to such a CCM message from another edge node, i.e. if response is received within given time period.

In another advantageous embodiment reception of CCM messages from other edge nodes is monitored and it is detected if no CCM messages are received from a particular edge node from which reception should take place with a given periodicity. However, the invention also covers other concepts where the actual detection or faults takes place in any other appropriate manner.

Optionally all edge nodes 10; . . . ;60 or end points comprise holding means 11; . . . ;61, for example respective databases, for holding path information about the paths to all other edge nodes or end points in the management domain. This path information includes information about all intermediate nodes of each path, particularly address information of such intermediate nodes. In one particular implementation the path information in an edge node database is received from a management system 100, for example pushed to it. The information can also be collected in other manners.

Preferably, as referred above, an edge node 10; . . . ;60 is adapted to, independently of any management system 100, initiate and perform a fault recovery procedure. The edge node 10; . . . ;60 is particularly adapted to be managed by a management system 100 holding address information of each intermediate node on each path between respective pairs of edge nodes in a management domain.

Even more particularly the edge node/the arrangement is adapted to be managed by a management system 100 holding physical topology information and active logical topology information for each service provided in the maintenance or management domain, which particularly is handled by a single operator.

Figure 4:
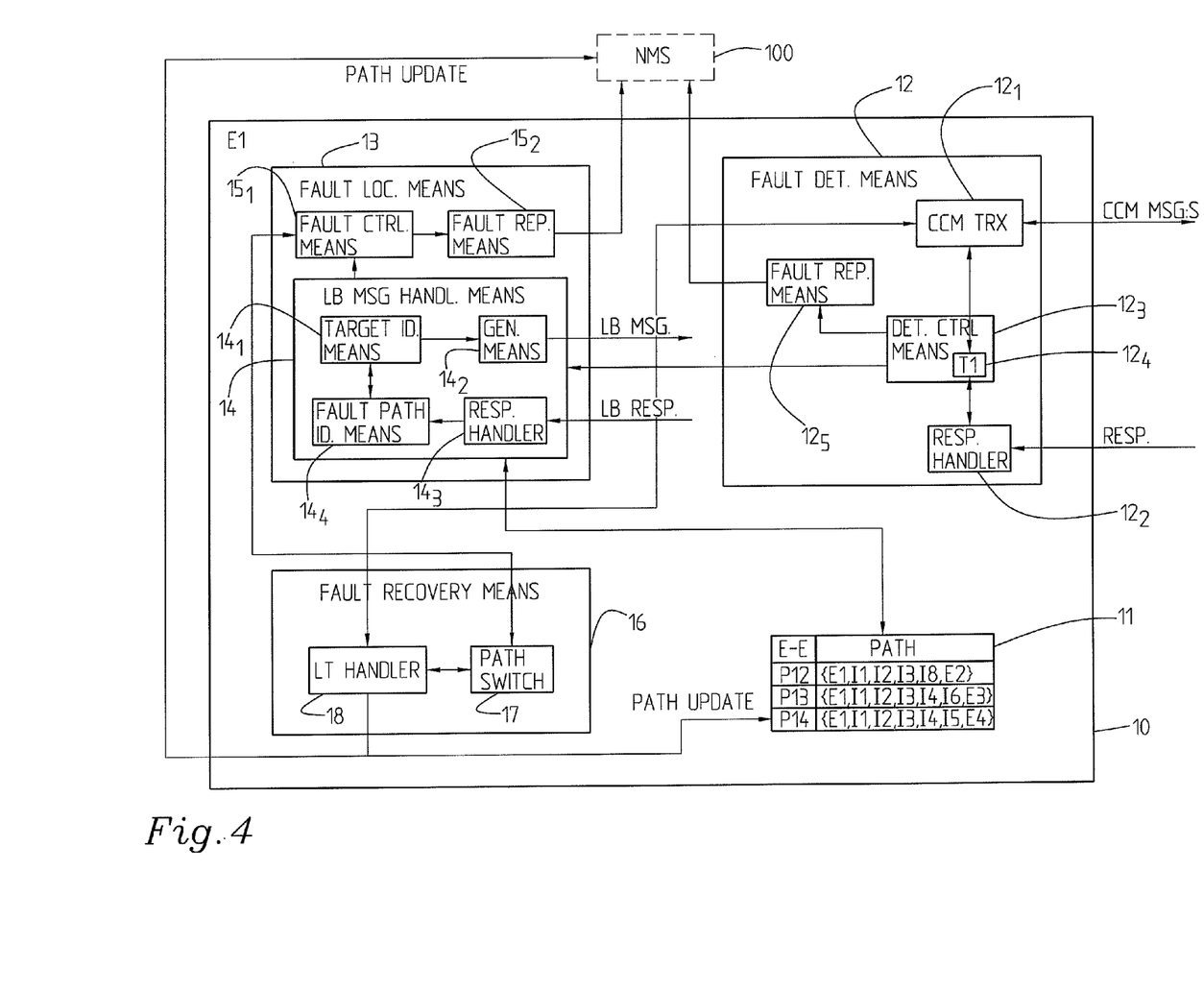
FIG. 4 is a schematical block diagram of an edge node according to an embodiment of the present invention.

Optionally an edge node 10; . . . ;60 is particularly adapted to, at detection and localization of a failure or a fault, initiate set up of an alternative path, particularly by means of fault recovery means 16, cf. FIG. 4. Such an alternative path may comprise a statically configured back-up path. Alternatively it comprises a dynamically configured path. The edge node 10; . . . ;60 is particularly adapted to receive connectivity check messages over a set up alternative path and to send out link tracing messages to find information about the intermediate nodes of such an alternative path. Even more particularly it is adapted to update its database 11; . . . ;61 holding path information upon reception of response messages from the intermediate nodes 1; . . . ;8 to said link tracing messages. It is preferably also adapted to send such updated information to the managing system so that it can update the topology information held therein.

In a preferred implementation, for fault localization purposes, an originating or first edge node 10; . . . ;60 (having detected a fault on a path) is adapted to send loop back messages to identified target intermediate nodes such that, depending on whether a response is or not from such intermediate node, the portion of the path containing the fault consecutively is reduced by a given percentage, for example about 50% if a node substantially in the middle of the path is identified as target intermediate node until the fault is localized. This means that the path portions identified as the path portions containing the fault in consecutive steps are divided into two portions, one of which containing the fault, which means that far fewer loop back messages have to be sent out compared to known methods.

In an advantageous implementation an edge node 10; . . . ;60 is adapted to, at detection of a fault on a path to another edge node, send loop back messages and await responses from said other or second edge node by consecutively dividing the path into a fault containing portion and a non-fault containing portion and sending consecutive loop back messages to identified target intermediate nodes in the respective identified fault path portions until no response is obtained from a target intermediate node, and a response having been received from a node, an intermediate node or an end point, adjacent to said target node on the path indicating the node providing no response as the node containing the fault itself or the link between said node and the adjacent node having provided a response.

Particularly the path information in each edge node 10; . . . ; 60 comprises a node sequence with intermediate node addresses provided in order between two end points.

Optionally also an edge node 10; . . . ;60 is provided having one or more of the above mentioned optional or advantageous features discussed with reference to the arrangement. Still further a method as referred to earlier in the document is provided which comprises one or more of the optional features discussed above with reference to the arrangement, but with the corresponding method steps.

The present invention is particularly focused on the management domain or maintenance association (MA) level of a single network operator domain. This can be done due to the fact that usually, or most appropriately, the network operator should take the responsibility of network failure recovery, rather than service providers or end customers. In order to make an arrangement or a method according to the present invention work optimally, it is assumed that the management system. NMS 100 managing the arrangement is aware of the addresses of the intermediate nodes, particularly MIPs 1; . . . ;8. This can particularly be justified since a network operator knows details about every node in the operators own network. It is also supposed that the NMS maintains both physical topology and active logical topology for each service provisioned in the MA. Still further, in the active logical topology, for each edge node or maintenance end point of a given MA, the NMS pushes the path information concerning the paths from the particular MSP to all other MEPs, to the database of the MEP in question. This means that each MEP will know, in an MA, how to reach all other MEPs and through which MIPs, or more generally intermediate nodes.

Basically, optionally, when one or more edge nodes 10; . . . ;60 detect failures in the network, instead of sending link trace massages to retrieve the addresses of MIPs or intermediate nodes, loop back messages are sent directly to target nodes in an appropriate manner in order to enable fast and easy localization of the fault. This is mainly made possible through the fact that each edge node maintains path information for the paths to all other edge nodes in the given management domain or maintenance association.

Preferably, in embodiments supporting fault recovery, substantially at the same time, an alternative path is set up for the fault containing path portion. In a particularly advantageous implementation a statically configured GMPLS backup path is used. This is advantageous since such a path can be set up extremely fast and in a simple manner. It should however be pointed out that the inventive concept is by no means limited to any specific mechanism for set up of alternative paths; on the contrary this can be done in many different ways once the fault has been detected and localized, which is the emphasis of the present invention.

In preferred implementations, once a fault has been localized, the edge node 10; . . . ;60 having localized it sends out a fault report or an error message to the NMS. Once the alternative path has been set up, the affected edge node will receive CCM messages again. Then it will send out link trace messages to find the new alternative path to the other edge nodes, i.e. establish the addresses of the intermediate nodes 1; . . . ;8, and update its database accordingly 11; . . . ;61. It also provides the NMS with the updated path information whereupon the NMS may verify the change and update its own topology map accordingly. Then NMS can take any appropriate action to handle the network failure which however will not be described herein, for example covering sending out staff to manually deal with the fault or any other appropriate solution in a more or less automatic manner.

Optionally preferably the IEEE 802.1ag mechanism for fault detection is implemented comprising sending of connectivity check messages. However, instead of strictly following the work flow as suggested by IEEE 802.1ag, where LT messages are first sent to locate intermediate nodes before any LB messages are send out, the edge node 10; . . . ;60 sends out LB messages directly as soon as it has detected a connectivity fault (and identified a target node). This is facilitated if the domain is a single network operator domain or similar.

A basic feature of the inventive concept deals with how an edge node sends LB messages. For a given path between a pair of edge nodes, instead of sending out a loop back message to the closest intermediate node first and then to the second closest intermediate node etc., an edge node 10; . . . ;60 will first send a message to an intermediate node 1; . . . ;8 located. substantially in the middle of the path between the two edge nodes. If this intermediate node actually responds, this means that the failure is located at the further or distant half of the path departing from the sending edge node. Otherwise the fault is at the closer or proximate half, i.e. in the portion of the path located closer to the sending edge node.

This means that the path will be divided substantially into two portions, one with a problem, i.e. the failure, and one without a problem. For the part that contains no fault, no further LB messages are needed. Instead, the sending edge node will focus on the problematic portion of the path. Thus, the path needed to be searched will, after sending of the first LB message, be shortened by approximately fifty percent.

The sending edge node 10; . . . , 60 will continue the procedure for the remaining fault containing portion and so on until the fault is actually localized. This will greatly speed up the process of locating faults. It should be clear that it does not have to be precisely the middle intermediate node, the main thing being that the path having to be examined will be reduced to a considerable extent in consecutive steps.

If it is well known that on a particular portion of the path there are many problems, some other target intermediate node could be selected depending on that particular knowledge. It should also be clear that it does not have to be the intermediate node right in the middle; for example if there is an even number of intermediate nodes, any of the "middle" or central nodes can be chosen.

A concept is suggested where each edge node contains path information as discussed earlier, and wherein selection of target intermediate nodes is controllable. It may for example be possible to alter selection procedure depending on actual path.

FIG. 1 shows an example of an MA managed by an NMS 100 and comprising four edge nodes, E1 10, E2 20, E3 30 and E4 40. It also comprises a number of intermediate nodes I1 1, I2 2, I3 3, I4 4, I5 5, I6 6, I7 7 and I8 8. Solid lines here indicate active links whereas dashed lines are available links which however are disabled to avoid loops in the network.

Each edge node E1, E2, E3, E4 may have a connection to the NMS 100 as illustrated by dashed-dotted lines, although the inventive concept is not limited to the provisioning of such connections.

Each edge node further comprises a respective database, DB 11, DB 21, DB 31, DB 41 containing, for each respective edge node, a list of path, information for the paths to all other edge nodes in the MA in the form of respective node sequences containing information about the respective intermediate nodes. Database 11 of E1 10 in one embodiment contains the following path information, for the paths between. E1 and E2, E1 and E3, E1 and E4 respectively:

P12=(E1, I1, I2, I3, I8, E2)
P13=(E1, I1, I2, I3, I4, I6, E3)
P14=(E1, I1, I2, I3, I4, I5, E4)

The databases of the other edge nodes E2, E3, E4 contain corresponding lists.

In FIG. 2 it is supposed that the link between the I3 and I4 is broken. It is also supposed that E1 10 is the edge node that first detects this fault. As discussed above, in its DB 11, E1 10 contains information about the addresses to all the intermediate nodes I1-I8. According to the invention E1 10 will start to send an LB immediately to a controllably selected intermediate node and preferably at the same time report the occurrence of a fault to the NMS 100. In the DB 11 of E1 10, P13 is, as discussed above the path between E1 and E3 and involves nodes E1, I1, I2, I3, I4, I6, E3.

In the above discussed state of the art solution, E1 would have sent the first LB to I1 and after reception of a response from I1 it would send an LB to I2, and after reception of a response, an LB to I3 etc.

According to the present invention however, E1 first establishes which is the target intermediate node, here substantially the middle node which is I3 on the path P13. Therefore E1 sends the first LB ($LB_1$) to I3. After reception of a response from I3, since the path from I1 to I3 is unbroken, I1 will be aware of the fact that the problem is located on the further or distant half of the path seen from E1. This means that E1 will not need to send any LB messages to I1 or I2. Instead E1 will identity a new target intermediate node as I4 and send a second LB message $LB_2$ to I4 since I4 is substantially the middle node between I3 and E3. This time, however, E1 will receive no response. Then E1 10 knows that the problem is located on the link between I3 and I4 or on the node I4 (the first and second target nodes being adjacent nodes, with no node inbetween). Thus, in a first step E1 10 identifies I3 as being the first target or middle intermediate node $I_{M1}$ and the distant path portion is identified as the fault portion. Then the second target or middle intermediate node will be identified, here I4 ($I_{M2}$).

In the figure $LB_{IR}$ denotes the response from I3 to loop back message $LB_1$ to I3 whereas from I4 or the second target intermediate node there is no response to $LB_2$. According to the present invention an edge node detecting a fault can implement an algorithm as follows:

It is supposed that an MA is composed of a set of edge nodes, a set of intermediate nodes and a set of links connecting the respective edge nodes via intermediate nodes. The set of edge nodes is here denoted E and each edge node is denoted $e_i$ wherein E=$\{e_1, e_2, \ldots, e_m\}$. The intermediate node set is denoted $I_j$, the intermediate nodes of the set being denoted: I=$\{i_1, i_2, \ldots, i_n\}$.

Each edge node will maintain path information to all other edge nodes in the same MA. The path information is preferably in the format of a node sequence where start and end points are members of E whereas all other points are members of I. As an example $P_{ij}$ denotes path information from $e_i$ to $e_j$, and may have the format: $P_{ij}=\{e_i, i_1, i_2, \ldots, i_k, e_j\}$. For any given edge node $e_i$ the fault localization procedure can be formulized as described below in FIG. 7.

Figure 3:
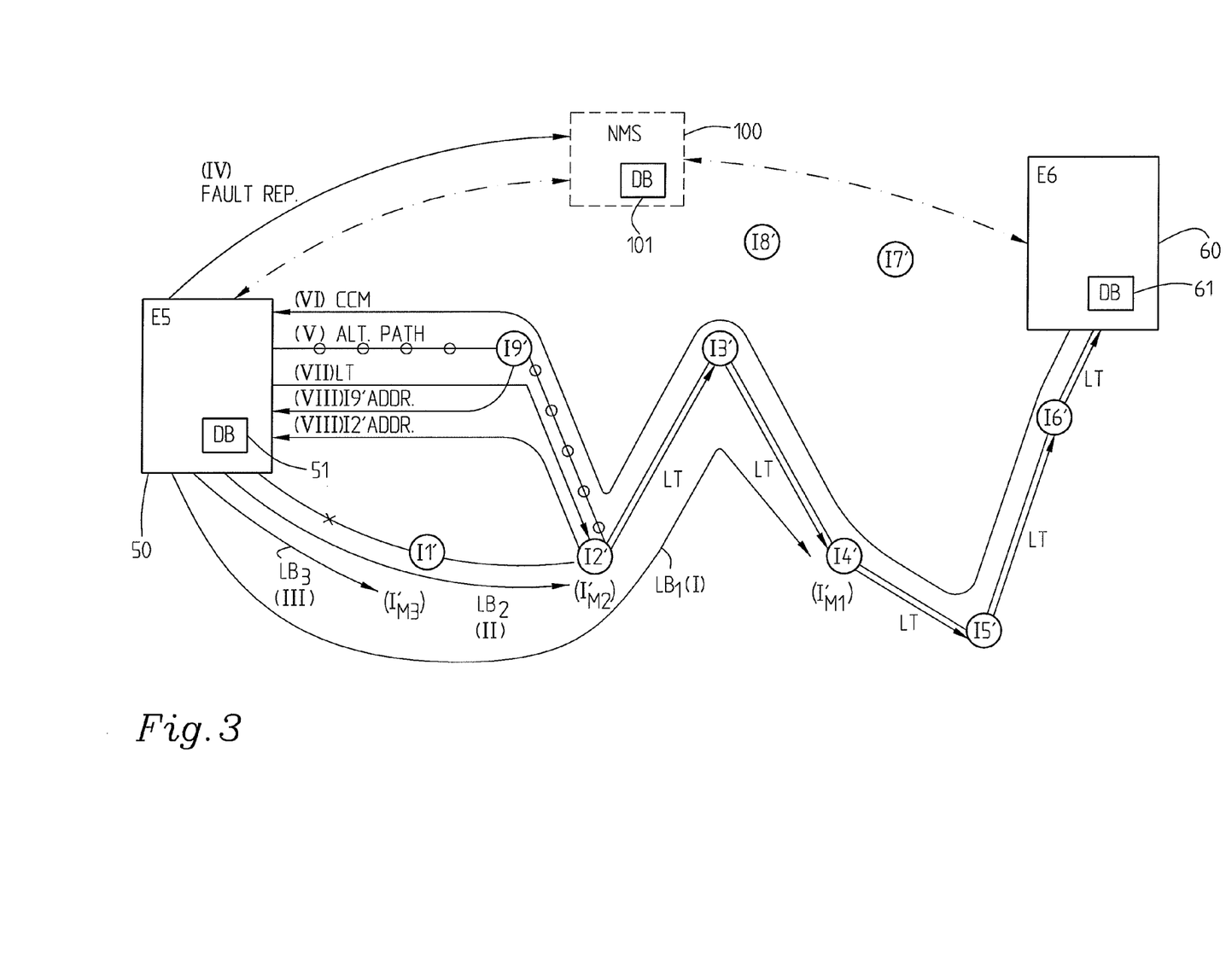
FIG. 3 is a schematical block diagram of an arrangement according to another embodiment of the invention indicating the sending of messages within the arrangement.

FIG. 3 shows an embodiment in which it is supposed that a fault is detected by an edge node E5 50 on a path between E5 50 and another edge node E6 60. The edge nodes E5 and E6 may be in communication with an NMS as discussed above. This figure merely describes the fault detection and fault localization.

The path between E5 50 and E6 60 goes via intermediate nodes I1', I2', I3', I4', I5', I6'. It is supposed that a fault has occurred between E5 50 and I1'. After locating a fault on the path, it is supposed that E5 50 identifies a first target intermediate node substantially in the middle of the path, called I'$_{M1}$, as I4'. E5 50 then sends a first loop back message LB$_1$ to I4', I. However, I4' does not respond. This means that E5 50 will know that it is the proximate or closer path portion that has a problem. Therefore E5 50 has to identify a new target intermediate node. It identifies I2' as a second target intermediate node, I'$_{M2}$. However, after sending a second loop back message LB$_2$ (II) to I2', there is also in this case no response to E5 50. E5 50 will establish that in this case the proximate closer path portion (of the first identified fault path portion) is the new path portion with a problem and identifies a new target intermediate node, in this case I1' (I'$_{M3}$). E5 50 then sends LB$_3$ to I1', III. As in this case there is also no response, E5 50 becomes aware of the fact that the fault must be on the link between E5 and I1' or on I1' itself. (I'$_{M2}$ and I'$_{M3}$ are adjacent nodes.) E5 50 then sends a fault report, IV, to NMS and defines an alternative path, V, using the information in DB 51, and/or a reconfigured alternative path is activated. E5 then starts receiving CCM messages from E6 60 again, VI. Then E5 50 starts sending out LT (Link Trace) messages to new intermediate nodes, or to the nodes on the alternative path, VII, and receive responses from I9' and I2', VIII, VIII, with their respective addresses. Then E5 50 (not shown in the figure) updates its database 51 with the new alternative path (new nodes and modified sequence) and the address information of the new intermediate nodes, and preferably also forwards information to NMS.

FIG. 4 shows an exemplary embodiment of an edge node E1 10 according to the present invention. Edge node E1 10 comprises fault detection means 12 and fault locating means 13 communicating with database 11. Alternatively the fault locating means 13 do actually comprise database 11. Edge node E1 10 also, in this embodiment, comprises fault recovery means 16. Fault detection means 12 here comprises CCM transmitting/ receiving means 12$_1$ for generating and sending CCM messages to other edge nodes and receiving CCM messages from other edge nodes. It is also comprises a response handler 12$_2$ in communication with a timer T1 12$_4$ of detection control means 12$_3$ adapted to determine whether CCM messages are received within a predetermined time interval. Alternatively it is established if a response to a sent CCM is received within a given time interval. If not, a fault has occurred. Fault reporting means 12$_5$ may be provided to activate sending of a fault or error report to NMS 100.

The detection control means 12$_3$ are adapted provide information to fault localizing means 13, particularly to LB message handling means 14. The LB message handling means 14 comprise target identifying means 14$_1$ for identifying respective target, particularly middle, intermediate nodes and communicating with LB message generating means 14$_2$ adapted to send LB messages to respective identified target intermediate nodes. LB message handling means 14 also comprises a response handler 14$_3$ adapted to wait for and receive LB responses and to provide information to fault path identifying means 14$_4$ as to whether a response is received or not within a given time period such that the portion of the path containing a fault can be identified in order to identify the subsequent target intermediate node etc. (unless the fault was located already). When a fault has been located, information thereon is provided to fault control means 15$_1$ which provide information to fault reporting means 15$_2$ which in turn provide information to NMS 100. The fault control means 15$_1$ also provide information to fault recovery means 16 comprising a path switch 17 and an LT handler 18. For example using information about fixed configured alternative paths, or in another embodiment establishing a new alternative path, a switch can be done to the alternative path (or back-up path). The LT handler 18 is in communication with the path switch 17 and communicates with DB 11 for sending LT messages on the new alternative path. New intermediate nodes respond to the sent LT messages with address information and LT handler 18 provides for updates to the DB with the addresses information of the new intermediate nodes of the new node sequence to DB 11, and preferably also to NMS 100.

It should be clear that the fault detection means, the fault location means and the fault recovery means can be implemented in many different ways, this merely showing one particular example. It should also be clear that the fault reporting means 12$_5$ of the fault detection means 12 are optional and could be constituted by the same means as fault reporting means 15$_2$ and the fault location or localizing means 13. The detection, location, and optionally recovery means can also be seen as comprised by one single means capable of performing the different functionalities detecting, locating and possibly recovering from fault.

Figure 5:
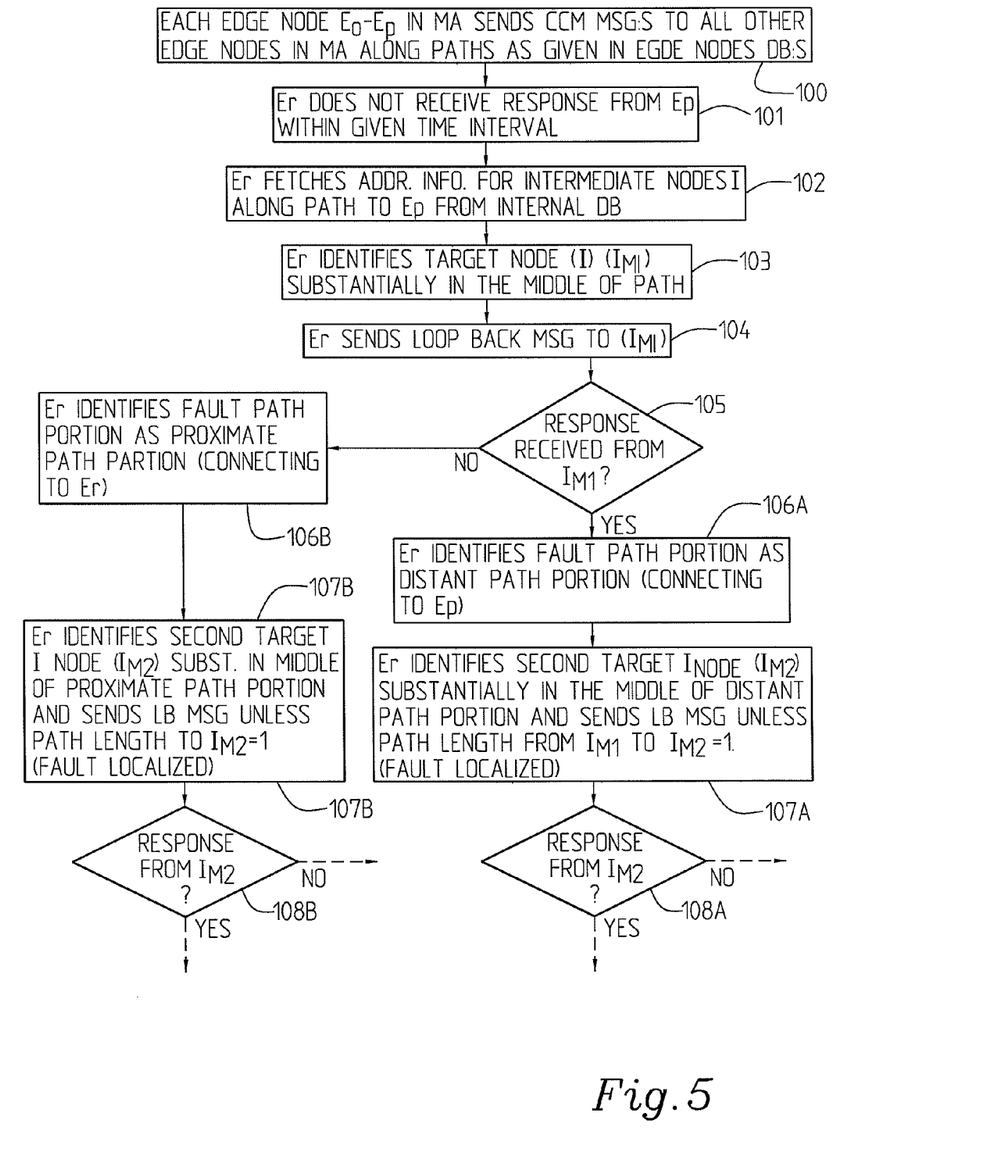
FIG. 5 is a schematical flow diagram describing fault detection and localization according to the invention.

FIG. 5 is a simplified flow diagram describing one embodiment of the present invention as an overview of fault detecting and fault localizing procedures in a particular implementation. It is supposed that each edge node $E_0$-$E_p$ in an MA sends CCM messages to all other edge nodes in the MA along given paths, wherein path information is held in respective edge node databases, 100. It is here supposed that $E_r$ does not receive any CCM (or a CCM response) from $E_p$ during (or within) a given time interval, 101. $E_r$ then fetches address information for intermediate nodes I along the path to $E_p$ from its internal DB, 102. Subsequently $E_r$ identifies a first target intermediate node ($I_{M1}$) substantially half-ways or in the middle of the path, 103. Then $E_r$ sends a loop back message to $I_{M1}$, 104. $E_r$ monitors if a response is received from $I_{M1}$ within a predetermined time interval, 105. If yes, $E_r$ identifies (the first) fault containing path portion as the distant path portion, connecting to or closer to $E_p$ than to $E_r$, 106A. Unless the fault is localized, here if the target node is adjacent to one of the edge nodes, $E_r$ itself or $E_p$, then $E_r$ identifies a second target intermediate node, $I_{M2}$, substantially in the middle of the said distant (fault containing) path portion and sends an LB message to $I_{M2}$ (unless the path length from $I_{M1}$ to $I_{M2}$=1, in which case the fault has been localized), 107A. If the second LB message is sent to $I_{M2}$, it is awaited to see if there is a response from $I_{M2}$, 108A, similar to the step 105 above, and the procedure continues until the fault has been localized.

On the other hand, if in step 105 above, $E_r$ identifies the fault path portion as the proximate path portion, connecting to or to closer to $E_r$, 106B, $E_r$ identifies a second target intermediate node, here $I_{M2}$', substantially in the middle of the said proximate path portion and sends a second LB message to $I_{M2}$' (unless the path length to I'$_{M2}$=1, in which case a fault has been localized), 107B. Similar to step 105 above, a response is awaited from I'$_{M2}$, 108B etc. and the procedure continues until the fault has been localized as discussed above.

Figure 6:
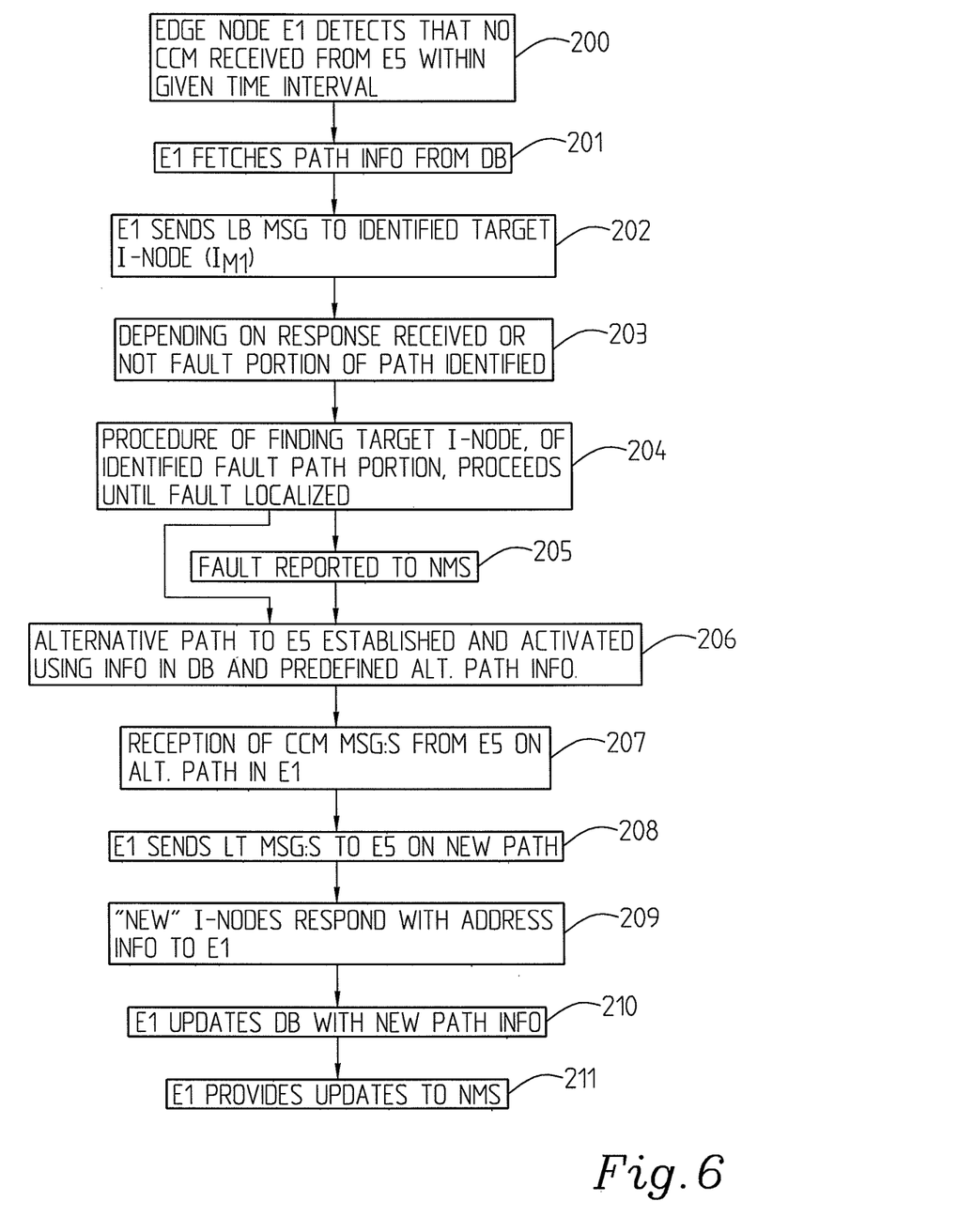
FIG. 6 is a schematical flow diagram describing the procedure in an edge node according to a particular embodiment, for fault detection, localization and recovery.

FIG. 6 is a flow diagram schematically describing a possible procedure in an edge node. It is supposed that edge node E1 detects that no CCM is received from E5 during a given interval, 200. E1 then fetches path information from DB concerning the path between E1 and E5 including address information of all intermediate nodes, 201. E1 then sends an LB message to the first identified target I-node, here called $I_{M1}$, 202. Depending on whether a response is received or not from $I_{M1}$ within a predetermined time period, a fault containing portion of the path is identified in E1, 203. The procedure of finding the respective target intermediate nodes and subsequent identifying step of finding fault containing path portions proceeds until the fault is localized, 204 and then the fault is reported to NMS, 205A, and substantially simultaneously, or in any arbitrary order, an alternative path to E5 is established and activated, e.g. using information in the DB of E1 or a predefined alternative path, 206.

In a particular embodiment the information in DB is not needed; it is sufficient with information about the location of the fault and predefined alternative paths are fixedly configured. Reception of CCM messages from E5 (on the alternative path) is reassumed, 207. E1 then sends LT messages to E5 on the new path, 208. New intermediate nodes respond with address information to E1, 209, whereupon E1 updates its database with the new path information, 210, comprising address information of the new intermediate nodes, 210, and E1 preferably also provides the updates to NMS, 211.

Figure 7:
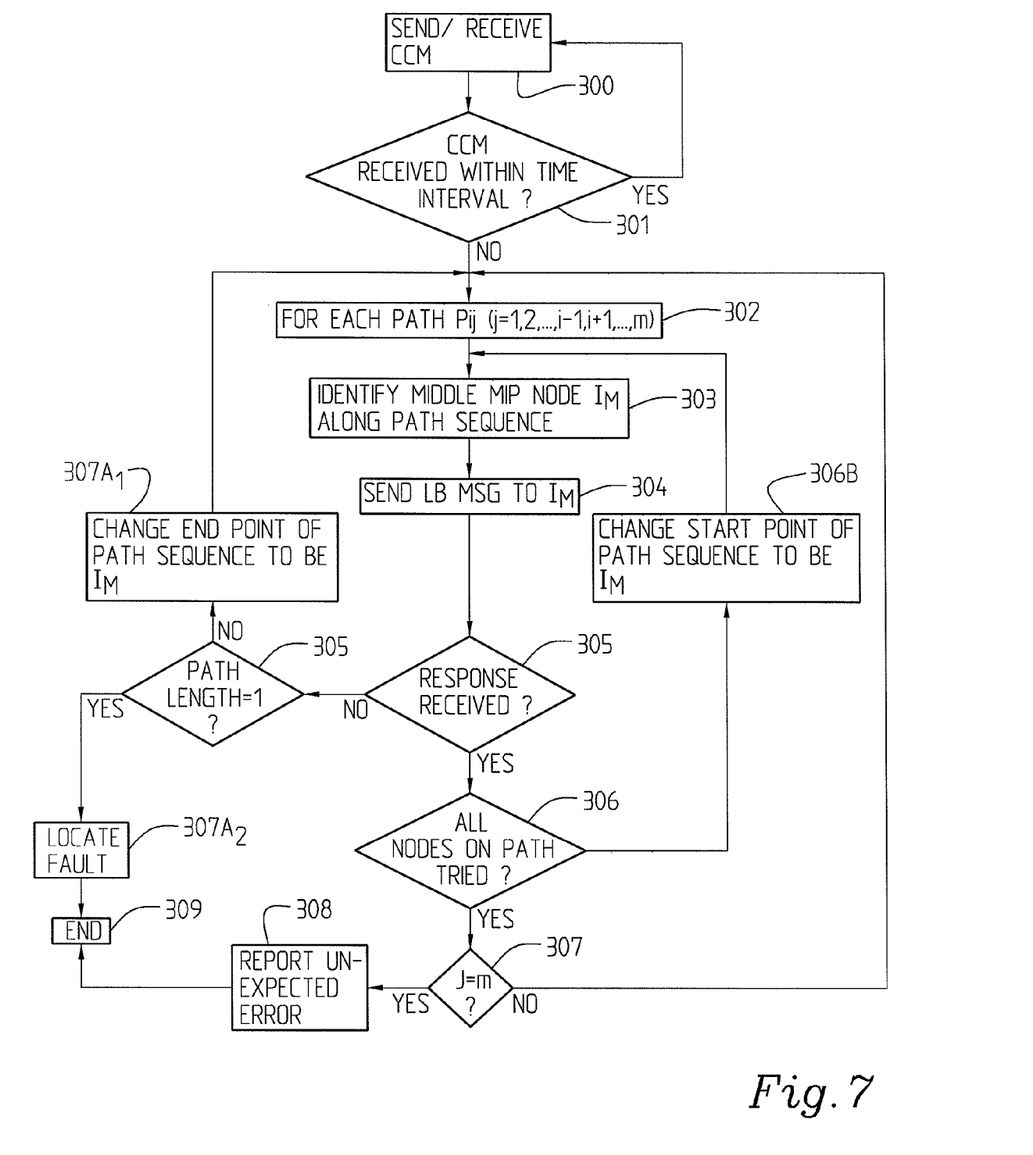
FIG. 7 is a more detailed flow diagram describing a fault detection and a fault localization procedure according to the present invention.

FIG. 7 is a flow diagram describing one example of a fault localization procedure that can be implemented in an edge node. It is supposed that an edge node sends/receives and monitors reception of CCM messages, 300. It is established if any CCMs are received during a given time interval, for example 3× as defined in IEEE 802.1ag as discussed above, 301. If yes, it proceeds sending and receiving CCM 300. If not, for each path $P_{ij}$ wherein j=1, 2, . . . , i−1, i+1, . . . , m in the path, 302, the middle intermediate MIP node $I_m$ along the path sequence is identified, 303. An LB message is then sent to $I_m$, 304. Then it is established if a response is received within a given time period, 305. If yes, it is established if all nodes on the relevant path have been tried, 306. If not, the start point of the path sequence is changed to $I_M$, 306B, and it is proceeded with step 303 above and a new intermediate node is identified etc. If yes, it is established if J=m, 307. If not, it is proceeded with step 303 above for the next J. If not, an unexpected error is reported, 308, and the procedure ends. If, however, in step 305 above, no response was received, it is established if the path link is equal to 1, 306A. If yes, the fault is located, $307A_2$, and the procedure ends. If the path link is not=1, the end point of the path sequence is changed to be $I_m$, $307A_1$, and it is proceeded with step 303 above for the next J.

As far as the fault recovery procedure is concerned, when a fault has been localized, the edge node will report the fault information to NMS, for example through SNMP or in any other manner. It should however be clear that the fault recovery process does not rely on any reaction on behalf of NMS upon this fault message. If a GMPLS backup path is statically configured in the network, it can automatically be switched to the backup path. It should be clear that also in other manners alternative backup paths can be configured fixedly or dynamically, or in any appropriate manner.

When an alternative or backup path has been activated, the edge node sending LB messages will start to receive CCM messages again. It will then send out LT messages to the edge node along the path on which it detected a fault. In this manner new intermediate nodes in the newly setup path will respond with their addresses and the sending edge node finds out the new path sequence to the affected edge node and updates its path accordingly as discussed above. Subsequently the sending edge node will send the update to NMS, which in turn preferably verifies if the update is in order by checking the network status. If the update is in order, the NMS will also update its active topology map for the given MA. Finally the NMS takes appropriate actions to handle the fault. It may for example be done by manual interaction or in any appropriate manner.

It is an advantage of the invention that this solution is based on the 802.1ag standard and that preferably message switch types and protocols are taken from the standard which can be implemented directly in products. This makes it very attractive for product development. It is also an advantage that through the inventive concept, complexity is kept at the edges of each maintenance domain and it provides a good scalability. Actually, the larger the network, the more significant are the benefits of the inventive concept.

In a particular embodiment a protection switching mechanism has setup back up paths in advance for critical parts of the network, i.e. network segments where heavy aggregation occurs. This means that when a link failure occurs, the network does not need to re-calculate an alternative path, instead it can use a pre-defined backup path directly. In that manner stringent fail-over time requirements can be met. When a backup path has started to function normally, the broken link can be repaired and re-configured, but this is not time-critical and can be done through NMS or in any other appropriate manner. Through the implementation of the inventive concept, dynamic path re-calculation mechanisms such as for example Spanning Tree Protocol and variants thereof can be disabled in the network, although the invention is not restricted thereto.

It should be clear that the invention is not limited to the specifically illustrated embodiments, but that it can be varied in a number of ways within the scope of the appended claims.

The invention claimed is:

1. A method for detecting and localizing a failure or fault in an Ethernet based carrier or access network managed by a management system and comprising a number of management domains on different levels, each with a number of end point or edge nodes and a number of intermediate nodes, the method comprising the steps of:

implementing fault detection by sending localization or connectivity check messages from each edge node to all other edge nodes in the management domain, and in each edge node monitoring detection of such messages from all other edge nodes;

at detection, in a first edge node, of a fault on the path between said first edge node and a second edge node:

fetching information about the path, containing the intermediate nodes on the path, from holding means in or communicating with the first edge node;

identifying a target intermediate node substantially in the middle of the path containing the fault;

sending, directly, a loop back message to the identified target intermediate node;

identifying a fault path portion as the portion of the path containing the fault based on whether a response is received or not from the identified target intermediate node, wherein:

if a response is received, the fault path portion is identified as the distant path portion, connecting to the second edge node, whereas if no response is received, the fault path portion is identified as the path portion connecting to the first edge node;

then, until the fault is localized, identifying a respective new target intermediate node and a new fault containing path portion, step by step, until the fault is localized.

2. The method according to claim 1, further comprising the step of reporting, from the first edge node, fault information concerning a detected and/or localized fault to the management system.

3. The method according to claim 1, further comprising the steps of:
- periodically sending, from an edge node, localization or connectivity check messages to all other edge nodes;
- monitoring reception of responses to connectivity check messages and/or reception of connectivity check messages from all other edge nodes; and,
- identifying a fault if no response is received within a predetermined time period and/or if expected connecting check message are not received with a given periodicity from an edge node.

4. The method according to claim 1, further comprising the step of, in each edge node, receiving and holding information about paths to all other edge nodes including all intermediate nodes on the respective paths.

5. The method according to claim 1, further comprising the steps of:
- switching, automatically, to and activating an alternative or back up path in a first edge node when a fault has been localized;
- receiving connectivity check messages over the alternative or back up path;
- sending link trace messages to the second edge node;
- receiving response messages with respective address information from all, or all new, intermediate nodes on the alternative or back-up path;
- updating, in the first edge node, the database with the new alternative path sequence and intermediate node address information; and,
- sending, from the first edge node, the updated new alternative path information to the management system.

6. The method according to claim 1, wherein the management domain is operated by a common or single operator.

7. The method according to claim 1, further comprising the steps of:
- keeping information about all the addresses of all intermediate nodes in the management system;
- holding information, in the management system, about the physical topology and about the active logical topology for each service provisioned in the management domain;
- pusing to each edge node database, of a given management domain, from the management system, path information concerning the paths between the respective edge node and all other edge nodes; and,
- updating the active topology information in the management system with received updates from edge nodes.

* * * * *

UNITED STATES PATENT AND TRADEMARK OFFICE
CERTIFICATE OF CORRECTION

PATENT NO.         : 8,154,991 B2
APPLICATION NO.    : 12/682470
DATED              : April 10, 2012
INVENTOR(S)        : Wei Zhao et al.

It is certified that error appears in the above-identified patent and that said Letters Patent is hereby corrected as shown below:

Delete Drawing Sheet 5 of 7 and substitute therefor the attached Drawing Sheet 5 of 7.

In Fig. 7, Sheet 7 of 7, delete "  " and insert -- -- , therefor.

In Column 1, Line 19, delete "SONET/SDH" and insert -- (SONET/SDH --, therefor.

In Column 1, Line 27, delete "sire" and insert -- are --, therefor.

In Column 1, Line 32, delete "tor" and insert -- for --, therefor.

In Column 1, Line 36, delete "an." and insert -- an --, therefor.

In Column 2, Line 7, delete "and." and insert -- and --, therefor.

In Column 2, Line 22, delete "tor" and insert -- for --, therefor.

In Column 5, Line 9, delete "or" and insert -- of --, therefor.

In Column 6, Line 38, delete "MSP" and insert -- MEP --, therefor.

In Column 7, Line 26, delete "located." and insert -- located --, therefor.

In Column 8, Line 3, delete "path," and insert -- path --, therefor.

In Column 8, Line 57, delete "$e_1$" and insert -- $e_i$ --, therefor.

In Column 12, Line 15, delete "then" and insert -- the --, therefor.

In Column 14, Line 19, in Claim 7, delete "pusing" and insert -- pushing --, therefor.

Signed and Sealed this
Fourth Day of September, 2012

David J. Kappos
*Director of the United States Patent and Trademark Office*